United States Patent [19]
Ruggeri

[11] 3,712,567
[45] Jan. 23, 1973

[54] WEAPON HANDLING APPARATUS

[76] Inventor: Joseph P. Ruggeri, 214 Third Avenue, Cherry Hill, N.J. 08034

[22] Filed: March 18, 1971

[21] Appl. No.: 125,671

[52] U.S. Cl. .................... 244/137 R, 294/74
[51] Int. Cl. .................... B64c 1/22
[58] Field of Search .......244/137 R, 118 R; 294/111, 294/112, 74; 214/75 H; 89/1.5

[56] References Cited

UNITED STATES PATENTS

| | | | |
|---|---|---|---|
| 3,191,787 | 6/1965 | Stearn | 294/74 X |
| 2,433,523 | 12/1947 | Mahan et al. | 244/137 R X |
| 3,093,031 | 6/1963 | Damm | 244/137 R X |

FOREIGN PATENTS OR APPLICATIONS

| | | | |
|---|---|---|---|
| 404,694 | 6/1943 | Italy | 244/137 R |

*Primary Examiner*—Milton Buchler
*Assistant Examiner*—Paul E. Sauberer
*Attorney*—R. S. Sciascia et al.

[57] ABSTRACT

Subject disclosure relates to novel and improved apparatus for loading and unloading a single weapon or bomb on the ejector rack of an aircraft. The improved apparatus includes a pair of cantilever elements which are secured to the ejector rack and extend outwardly from opposite sides thereof, a bomb engaging band which extends around the lower periphery of the bomb, a pair of sheave assemblies which are connected to the band and extend upwardly from opposite sides of the bomb, a power hoist which depends downwardly and outwardly from one cantilever element, and a cable which is secured at one end to the other cantilever element and extends downwardly around one sheave, around the other sheave and upwardly to the hoist.

5 Claims, 3 Drawing Figures

PATENTED JAN 23 1973
3,712,567
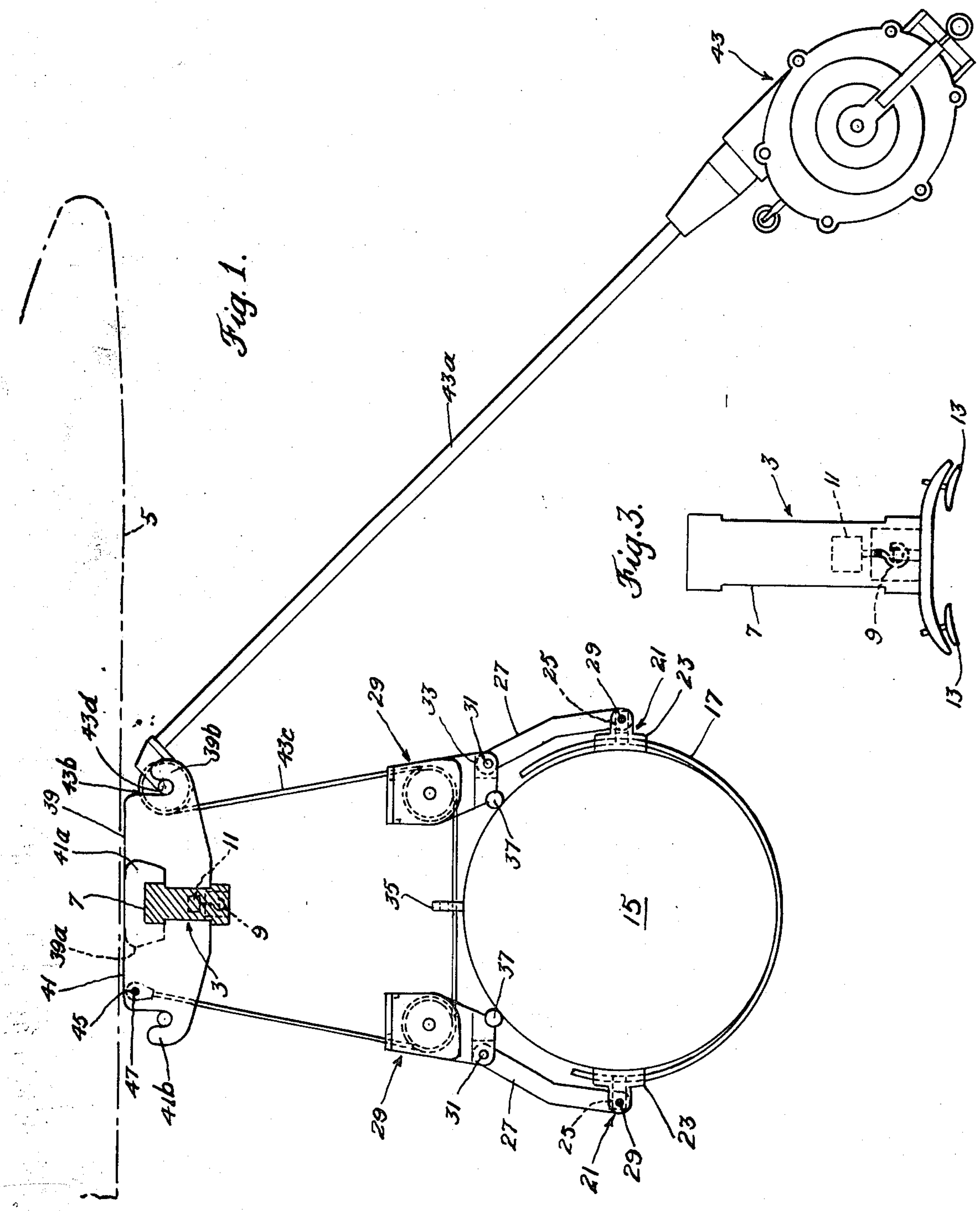
INVENTOR.
JOSEPH P. RUGGERI
BY
Arthur L. Collins
ATTORNEY

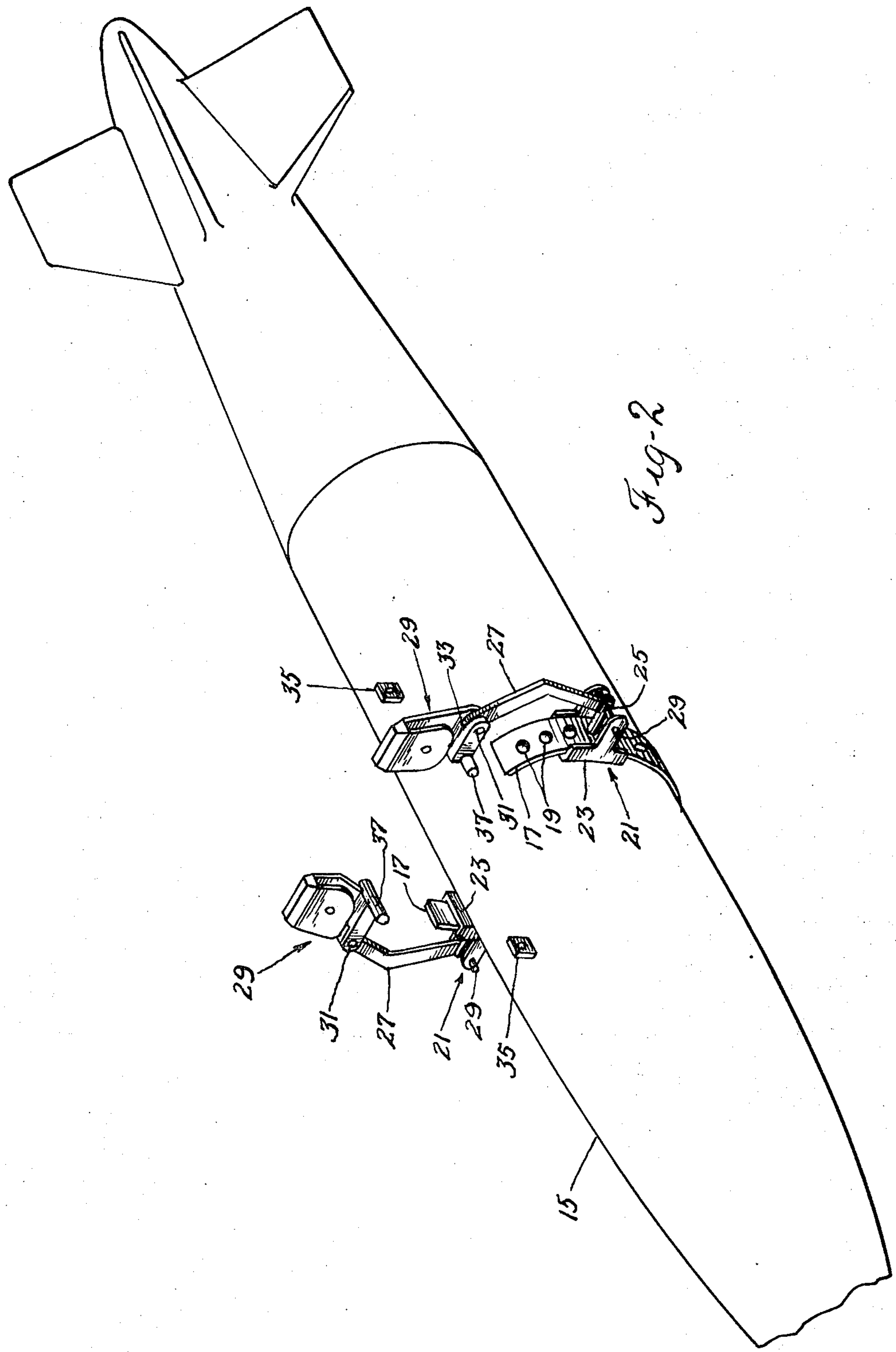
INVENTOR.
JOSEPH P. RUGGERI
BY
Arthur L. Collins
ATTORNEY

WEAPON HANDLING APPARATUS

The invention described herein may be manufactured and used by or for the Government of the United States of America for governmental purposes without the payment of any royalties thereon or therefor.

Various types of handling apparatus have been devised and used in the past to load and unload bombloads on military aircraft. Considerable difficulty has been experienced heretofore, however, in providing apparatus of this kind which satisfies the requirements of the operation in a practical and effective manner.

It is therefore a principal object of the invention to provide novel and improved apparatus for loading and unloading a bombload on an aircraft.

It is a further object of the invention to provide novel and improved bomb handling apparatus which requires no restraining device other than a single bomb engaging band to maintain the bomb in a secure stable condition during loading and unloading operations.

It is a further object of the invention to provide novel and improved bombload handling apparatus which requires the use of only one hoist mechanism.

It is a further object of the invention to provide novel and improved bombload handling apparatus which doubles the mechanical advantage of the hoist mechanism used, thereby permitting the use of one 2000 pound capacity hoist in raising 4000 pound loads.

Other objects and many of the attendant advantages of this invention will be readily appreciated as the same becomes better understood by reference to the following detailed description when considered in connection with the accompanying drawing wherein:

FIG. 1 is an end view partly in section of a preferred embodiment of the invention where the bomb is being loaded on an aircraft;

FIG. 2 is a perspective view of the bomb engaging band of the invention positioned around the lower peripheral surface of the bomb with the sheave assemblies attached to the band and extending upwardly from opposite sides of the bomb without the hoist cable being reeved through the sheaves; and FIG. 3 is an enlarged cross-sectional view of a preferred embodiment of a bombrack to which a bombload assembly may be secured by means of the improved apparatus of the invention.

Referring now the the various figures of the drawing, it will be noted that the bombload ejector rack 3 is suspended from the lower surface of the wing or fuselage 5 of the aircraft in any suitable manner. The bombload ejector rack 3 includes the elongated structural frame or housing 7 which is generally rectangular in cross-section, two or more bombload suspension hooks 9 positioned in recesses in the bottom of the frame 7, an ejector mechanism 11 which controls operation of the suspension hooks 9 between open and closed positions and two or more pairs of adjustable sway braces 13. Inasmuch as the structural and operative details of the identified and other components of the bombload ejector rack 3 by themselves form no part of the present invention, a full description of the same is not included herein for the sake of simplicity. For a full understanding of the invention, it need only be understood that for release and ejection of the entire bombload 15, a suitable mechanical or electrical impulse is employed to energize the ejector mechanism 11, operate the suspension hooks 9 to their open position and release the bombload assembly 15 from the rack 3. The conventional adjustable sway braces 13 engage the exterior surface of the bombload 15 and limit its pitching and yawing movement on the suspension hooks 9.

The bomb engaging band 17 is constructed of any suitable high tensile strength material and includes a plurality of apertures 19 equally spaced along its length. The anchor fittings 21 on band 17 include a U-shaped channel element 23 in which the band 17 may be positioned and a split pin 25 which is secured to the base of the channel element 23 and extends upwardly therefrom as shown in FIG. 2. Apertures in projected portions of the sides of the channel element 23 are aligned with a similar aperture in the split pin 25. The bell crank-shaped link 27 is pivotably secured to the anchor fitting by the pin 29 which extends through the apertures in the projected sides of the channel element 23, the split pin, and one end of the link 27. The link 27 is also pivotably connected to the sheave assembly 29 by the pin 31 which extends through apertures in the clevis-shaped portion 33 of the base of the sheave assembly 29 and the other end of the link. The sheave in the sheave assembly 29 is rotatably mounted in a suitable housing which is preferably open on one side along the lower periphery of the sheave to facilitate reeving the sheave in a manner which will be more apparent hereinafter.

As shown in the drawing, the cantilever bombload hoist adapter elements 39 and 41 may be hooked or securely positioned on the frame or housing 7 of the bombload ejector rack 3 such that they project outwardly from either or both sides thereof. The upper portion of one end of each cantilever element includes a hook-shaped projection **39*a* or 41*a* which is designed such that in its locked position on the ejector rack 3, the inner surface of the end of the projection 39*a* or 41*a* engages one side of the ejector rack frame 7 and the lower portion of the end of the element 39 or 41 engages the other side of the ejector rack frame 7. The lower portion of the other end of each cantilever element 39 or 41 includes a bifurcated hook-shaped projection 39*b* or 41*b***.

It is to be understood that although the dovetailed ends **39*a* or 41*a* of the cantilever elements are preferably designed as described herein to engate the frame 7** and support a load on a rack which is generally rectangular in cross-section, any other suitable design of the cantilever element could be used to engage a similar or other type of rack frame without departing from the spirit or scope of the invention.

The hoist 43 is of conventional design and preferably includes a gas powered cable storage and payout reel not shown in the drawing, an elongated tubular arm **43*a*, a sheave 43*b* journaled on the end of arm 43*a* and a cable 43*c*. The bifurcated hook-shaped projection 39*b* or 41*b* of the cantilever element 39 or 41 is designed to cradle the trunnioned ends of the shaft 43*d* on which the sheave 43*b* of hoist 43 rotates such that the hoist 43 is supported thereby and extends downwardly and outwardly from the bombload assembly 15. When a bomb is to be loaded on the aircraft as indicated in FIG. 1 of the drawing, the cable 43*c* of hoist 43 extends from the hoist storage and payout reel, through its tubular arm 43*a*, about the sheave 43*b*, about the sheave of sheave assembly 29 on one side of the bomb 15, about the sheave of the sheave assembly 29 on the other side of the bomb 15 to a suitable pin element or the like 45 which when secured in the aperture 47 in the cantilever element 41 provides a suitable anchor for the end of cable 43***c*.

In operation, when bomb 15 is to be secured on the aircraft, the bomb is positioned beneath the aircraft wing or fuselage 5 such that the upwardly directed lugs 35 are vertically aligned with the suspension hooks 9 on the ejector rack 3. The cantilever elements 39 and 41 are then positioned on the frame of the ejection rack 3 such that they extend outwardly from opposite sides of the frame. The hoist 43 is then positioned and cradled on the bifurcated hook-shaped projection of one cantilever element 39. One end of the bell crank shape link 27 of one sheave assembly is coupled to the end hole of band 17 utilizing anchor fitting 21 and pin 29. The free end of band 17 is passed under and around the periphery of the weapon 15 at a point near midway between the lugs 35 where a lifting force applied to the band will approximately pass through the center of gravity of the weapon. The bell cranked shape link 27 is similarly coupled to a hole in band 17, appropriate to the diameter of the weapon to be raised. The sheave assemblies 29 are then coupled to the other ends of the bell crank shaped links 27. The cable 43*c* of the hoist is then reeved from the hoist sheave 43*b* about the sheaves on the sheave assemblies 29 to the anchoring pin 45 in aperture 47 of cantilever element 41. The hoist 43 is then energized so that cable 43*c* is retracted and the bomb 15 is lifted upwardly toward the rack 3 on the aircraft. During the lifting operation, the sheaves in the sheave assemblies 29 are preferably positioned inside the lateral extremities of the bomb 15. In this way, tension in the cable 43*c* increases the gripping action of the band 17 about the bomb 15 and the cylindrical projections 37 on the inside lower edge of the base of the sheave assemblies 29 engage the upper peripheral surface of the bomb. When the lugs 35 on the bomb are fully inserted in the recesses in the ejection rack 3, the ejector mechanism 11 is energized and the suspension hooks 9 are operated to their closed position where they engage lugs 35 and secure the bomb on the aircraft bombrack. The hoist cable is slackened sufficiently to permit removal of the sheave assemblies 29 and band 17. The cantilever element anchor pin 45 is removed, cable 43*c* is passed to hoist side of weapon load and hoist 43 is removed. Cantilever elements 39 and 41 are then removed from the frame of rack 3 and the aircraft is ready for other preflight operations. Removal of the bomb 15 from the aircraft is accomplished by reversing the described bomb loading procedure.

Obviously, many modifications and variations of the present invention are possible in the light of the above teachings. It is therefore to be understood that within the scope of the appended claims, the invention may be practiced otherwise than as specifically described.

What is claimed is:

1. Apparatus for loading and unloading a single weapon on an aircraft ejector rack, said apparatus comprising:

- a weapon engaging band adapted for extending around the lower peripheral circumference of the weapon and about the center of gravity of the weapon during operation;
- first and second anchor fittings connected to said band at locations substantially diametrically opposed to each other when said band is adapted for engaging the weapon;
- first and second links each having first and second ends with said first ends connected to respective first and second anchor fittings and said first and second links extending upwardly and inwardly therefrom so that the second ends of said links are separated a lesser distance from each other than said first ends;
- first and second sheave assemblies respectively connected to said second ends of said first and second links, having a cylindrical bearing adapted for gripping the weapon, said first and second sheave assemblies being separated from each other a predetermined distance of less than the distance between said first and second anchor fittings during operation;
- a first cantilever element adapted for securing to the aircraft ejector rack and for extending outwardly from one side of said rack;
- a second cantilever element adapted for securing to the ejector rack opposite said first cantilever element and for extending outwardly from the opposite side of the ejector rack;
- connecting means affixed at one end to the second cantilever element and extending downwardly around said second sheave, around said first sheave and upwardly to said hoist for tensioning said connecting means so as to draw said band and said cylindrical projections for tightly gripping the weapon during operation.

2. The apparatus substantially as described in claim 1, wherein said connecting means comprises a cable.

3. The apparatus substantially as described in claim 2, wherein each anchor fitting may be secured to the band at any of a plurality of predetermined points therealong.

4. The apparatus substantially as described in claim 3, wherein each sheave assembly includes a housing which is open on one side so that the cable may be readily reeved or unreeved.

5. The apparatus substantially as described in claim 4, wherein the hoist is a gasoline powered device.

* * * * *